Figure 2:
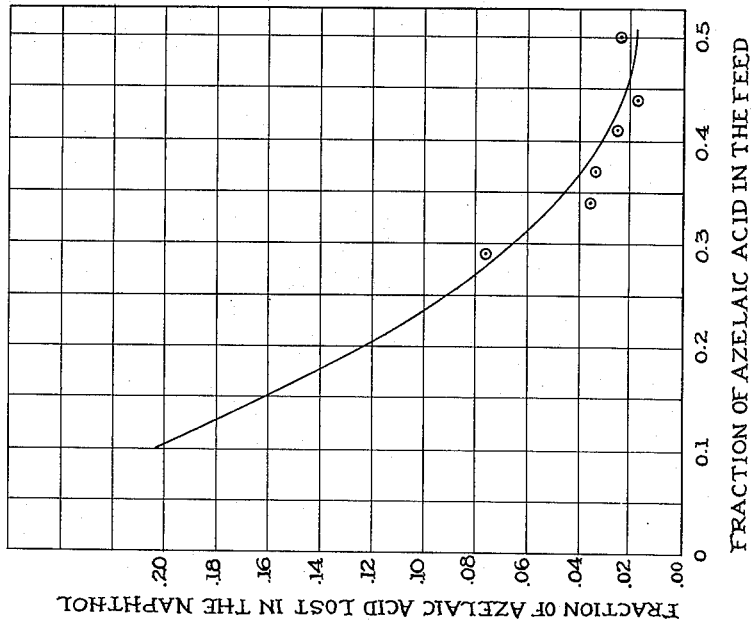

Aug. 29, 1961 T. C. MANLEY 2,998,439
PROCESS FOR THE SEPARATION AND RECOVERY
OF MONOBASIC AND DIBASIC ACIDS
Filed March 19, 1959 2 Sheets-Sheet 1

INVENTOR
THOMAS C. MANLEY

BY Cameron, Kerkam & Sutton
ATTORNEYS

THE EFFECT OF A VARIATION IN NAPHTHOL TO ACIDS FEED RATES ON THE DIBASIC ACIDS LOST IN THE NON-POLAR SOLVENT

THE EFFECT OF A VARIATION IN WATER TO ACIDS FEED RATES ON THE DIBASIC ACIDS LOST IN THE NON-POLAR SOLVENT

INVENTOR
THOMAS C. MANLEY
BY Cameron, Kerkam & Sutton
ATTORNEYS

2,998,439
PROCESS FOR THE SEPARATION AND RECOVERY OF MONOBASIC AND DIBASIC ACIDS

Thomas C. Manley, Philadelphia, Pa., assignor to The Welsbach Corporation, Philadelphia, Pa., a corporation of Delaware
Filed Mar. 19, 1959, Ser. No. 800,506
5 Claims. (Cl. 260—419)

This invention relates to a process for the separation and recovery of monobasic and dibasic acids and more particularly to the separation of such acids from an admixture thereof resulting from any one of several well known methods for the production of mono and dicarboxylic acids.

A process for the production of a mixture of monobasic and dibasic acids is described in U.S. Patent No. 2,865,937, issued December 23, 1958. As described in this patent, unsaturated fatty acids such as oleic and linoleic are treated with ozone and the ozonized products subjected to oxidative cleavage. The principal products of this patented process are caproic, pelargonic and azelaic acid. Another U.S. Patent No. 2,813,113, issued November 12, 1957, describes a similar process also using ozone. Prior to these patents, U.S. Patent No. 2,450,858, which issued October 5, 1948, described oxidative cleavage using chromic acid. Other methods known to the art employ nitric acid, potassium permanganate, air, etc., for oxidative cleavage.

Certain difficulties are inherent in the separation of monobasic and dibasic acids from one another. In the patents referred to above, most of the monobasic acids are distilled from the mixture. The remainder of the mixture is then washed with hot water to extract the water soluble dibasic acids from the insoluble residue materials.

While it is relatively easy to separate azelaic acid from inert material by dissolving it out with hot water, it has been found that the presence of monobasic acids, such as caproic and pelargonic acids, modify the behavior of the azelaic acid so that dissolving out with hot water is no longer possible; any azelaic acid thus extracted is very impure; and, furthermore, as shown by U.S. Patent No. 2,389,191, the amount of water required is so great that the cost of the separation, including subsequent evaporation of the very dilute water solution, is excessive.

On the other hand, it would be relatively easy to separate the monobasic acids such as pelargonic acid, from inert material by extracting with a non-polar solvent such as petroleum ether. However, when a dibasic acid such as azelaic acid or suberic acid is present, the behavior of the monobasic acid is so modified that good extraction cannot be obtained. This is also shown in U.S. Patent No. 2,389,191.

Separation of monobasic and dibasic acids from one another is greatly impeded by the great affinity which these acids have for one another. Any effort to remove one acid from a mixture of acids generally removes all the acids and the desired separation or purification in respect to one acid is not obtained. This difficulty applies in varying degree to all methods of separation of acids— whether by distillation, crystallization, precipitation, extraction, partial neutralization, and the like. In addition, many known methods, as referred to above, has specific disadvantages such as decomposition, product degradation, and low yields.

It is therefore one of the objects of the present invention to provide a process for the separation and recovery of monobasic and dibasic acids which overcomes these difficulties in which the monobasic acids are readily recoverable from the polar solvent and the dibasic acids are readily recoverable from the non-polar solvent.

The present invention quite unexpectedly provides that if the mixture of these acids is kept above a certain temperature, the intermolecular complexes of the acids are dissociated. Separation of the monobasic acids from the dibasic acids then becomes possible by differential solubility in polar and non-polar solvents. The present invention also most unexpectedly provides certain relationships between the concentration of the constituents of the mixture of acids and the relative amounts of solvents employed to obtain decided advantages in the separation and recovery of the desired acid products.

The process of the present invention requires correlation of three sets of conditions for its successful accomplishment. These conditions are described and illustrated hereinafter by reference to specific examples dealing with the separation of a mixture of acids consisting of essentially caproic and pelargonic acids, representing the monobasic fraction, and essentially azelaic acid representing the dibasic fraction. Other monobasic and dibasic acids are known to have been present in these examples but their presence does not affect the results obtained nor in any way alter the present inventive concept. The three sets of conditions to be correlated are temperature, the composition of the acid feed, and the relative amounts of solvents employed.

In accordance with the present concept the effect of temperature of the mixed acids is critical. It is well known that the solubility of certain acids is directly proportional to the solvent temperature. Above a certain critical temperature limit in the present process effective separation is obtained without undue loss of the monobasic acids into the water phase, and without loss of the dibasic acids into the organic phase.

Control of the amounts of the monobasic and dibasic acids in the mixture is necessary in the present concept. Monobasic acids and dibasic acids are mutually soluble. While the monobasic acid is preferentially separated in an organic solvent in the present process and at the same time the dibasic acid is preferentially separated in water, each of these acids is soluble to a lesser extent in the other solvent. In the present invention the relative amounts of monobasic and dibasic acids in the mixture of acids to be separated determines the amount of the particular acid recovered in the preferential solvent.

The amounts of the selected solvents used control the amount of the acid recovered in the solvent. The relative amount of monobasic acid found in the water phase as well as the amount of dibasic acid found in the organic phase are shown in the following examples as a fraction of the ratio of each particular solvent to the total acids feed. The ratio of organic solvent to total acids, and water to total acids in the present process controls the recovery of the desired product acids in each of the particular solvents.

The process of the present invention is capable of various procedural modifications some of which are illustrated by the following examples thereof. From the foregoing general description of the present process and from the examples now to be described, it will be apparent to those skilled in the art that various changes and modifications may be made thereto without departing from the inventive concept. Reference should therefore be had to the appended claims for a determination of the scope of the invention.

In all of the following examples, the mixture of acids, water and an organic solvent were continuously fed to a countercurrent column. In this column, multiple stages of mixing and settling were accomplished. The two phases, water and organic solvent, were continuously withdrawn from the column in such a fashion that the two phases were always equal to the three inputs, mixture of acids, water, and organic solvent.

The mixture of acids in the following examples was obtained by the ozonization of unsaturated fatty acids containing oleic and linoleic acids.

When pure oleic acid is cleaved by oxidation, only pelargonic and azelaic acids are obtained. When pure linoleic acid is cleaved by oxidation, only caproic, malonic, and azelaic acids are obtained. In natural occurring substances the starting materials are not pure and therefore do not produce exactly the products theoretically predicated. In addition to caproic acid (6 carbon monobasic acid), some 5 carbon valeric acid, 7 carbon heptoic acid and even 8 carbon caprylic acid are obtained. For the same reasons, in addition to the 9 carbon pelargonic acid, some 8 carbon caprylic acid and some 1 carbon capric acid are obtained.

In the case of the dibasic acids, while the 3 carbon malonic acid, and the 9 carbon azelaic acid are obtained, it has been found that some 6 carbon adipic acid, 7 carbon pimilic acid, 8 carbon suberic acid, and 10 carbon sebacic acid are also obtained.

The relative solubility of caproic acid (6 carbons) compared to pelargonic acid (9 carbons), in a non-polar solvent such as the aliphatic hydrocarbon solvents described above, is only a matter of degree. However, the difference in solubility of any monobasic acid in the range from 6 carbon atoms to 10 carbon atoms with respect to a non-polar solvent and to a polar solvent is on the order of 1 or more magnitudes and is not a mere matter of degree.

The relative solubility of adipic acid (6 carbons) compared to azelaic acid (9 carbons), in a polar solvent such as water, is only a matter of degree. However, the difference in solubility of a dibasic acid in the range of from 6 carbon atoms to 10 carbon atoms, with respect to a polar solvent and a non-polar solvent, is on the order of 1 or more magnitudes and is not a mere matter of degree.

The present invention employs the preferential solubility of monobasic acids in a non-polar solvent as well as the preferential solubility of dibasic acids in a polar solvent.

The organic solvent used in these examples is a petroleum fraction of mineral spirits. Any aliphatic hydrocarbon is a suitable solvent in the present process if it has the following several properties:

(1) Solubility of monobasic acids in the solvent.
(2) A boiling range of the solvent to permit its separation from dissolved monobasic acids.
(3) A high flash point, since elevated temperatures are expected.
(4) Availability.
(5) Low cost.
(6) Minimum losses due to extreme volatility.
(7) Ease of storage.

A suitable aliphatic hydrocarbon solvent is:

Common name_____ Naphthol mineral spirits.
Boiling range, °F_____ 307 to 340.
Specific gravity, at 60° F_____ 0.7599.
Flash point, °F., Tag C.C____ 102.

In the following examples, this organic solvent is described as "naphthol" but it is to be understood that all aliphatic hydrocarbon solvents with a boiling range up to 200° C. may be used.

EXAMPLE 1

In an illustrative example of the present invention, 5.00 pounds of monobasic acids and dibasic acids containing 1.50 pounds of azelaic acid and the remainder essentially pelargonic and caproic acids were countercurrently extracted with 23.00 pounds of water and 11.00 pounds of naphthol mineral spirits. The temperature of the continuous mixing and settling device was maintained at 85° C. The ratio of feeds, water/acids was 4.6; the ratio of naphthol/acids was 2.2. The water phase was collected, cooled, and the crystallized azelaic acid separated by filtration. The dry pure azelaic acid obtained was 1.37 pounds. The water was evaporated from the filtrate and the water soluble residues contained 0.09 of a pound of azelaic acid. The organic phase was collected and the naphthol removed by distillation. In the remainder acids, 0.02 of a pound of azelaic acid was found.

Figure 1:
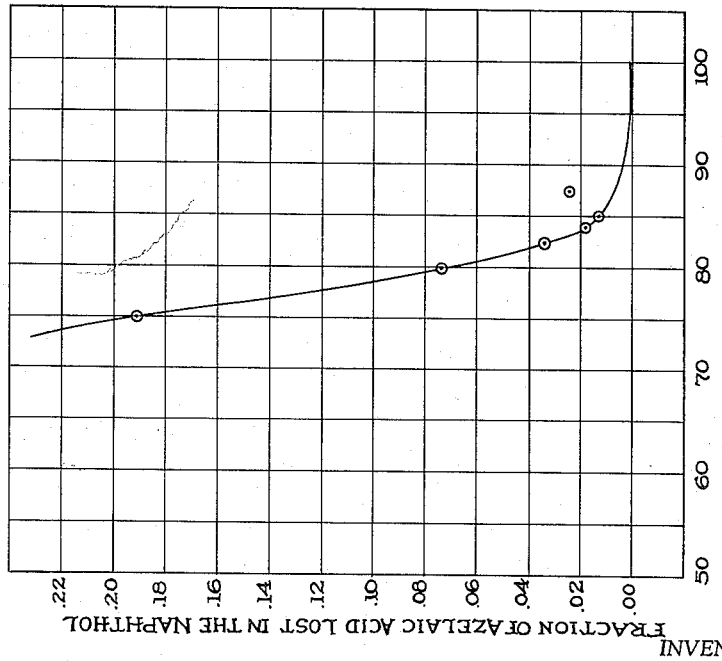

Example 1, together with Examples 2–6, are summarized in Table I. The data in Table I are shown graphically in FIG. 1 of the accompanying drawings where the losses of azelaic acid in the organic phase are plotted against the temperature. It can be seen from Table I and FIG. 1 that the loss of azelaic acid into the organic phase increases as the temperature is decreased from about 85° C. Above about 85° C., only negligible amounts of azelaic acid were found in the organic phase. This temperature, 85° C., referred to hereinafter is "the dissociation temperature" for the present process.

The data of Table I were obtained by operation at atmospheric pressure. Higher temperatures than shown give the same results. However, pressures greater than atmospheric would be required to prevent the complete change of the water solvent to its vapor phase. The relationship of pressure and temperature with respect to the vapor pressure of water and organic solvents are well known in the art. It is therefore within the scope of this invention to employ a pressure consistent with the temperature selected to prevent vaporization of the solvents.

When the composition of the acids feed is changed, the relative solubility of the dibasic acids is modified. In addition to Examples 3, 4, 5 and 6 of Table I, Examples 7 and 8 in Table II show the effect of variation in composition of the acids feed. Examples 3 through 8 inclusive are shown graphically in FIG. 2 of the accompanying drawings where the losses of azelaic acid in the organic phase are plotted against the fraction of azelaic acid in the acids feed.

When the ratio of dibasic acids to total acids feed is about 0.10, the fraction of azelaic acid lost in the organic phase is about 0.12 of the total azelaic acid expected. On the other hand, when the ratio of azelaic acid to total acids feed is 0.50, the fraction of azelaic acid lost in the organic phase is less than 0.02 of the total azelaic acid expected.

Increasing the concentration of dibasic acids in the acids feed from a fraction of 0.50 to slightly less than unity only reduces the fraction of dibasic acids found in the organic phase to a value less than 0.02.

It is therefore within the scope of the present invention to employ a fraction of dibasic acids to total acids which falls in the range from at least 0.10 to slightly less than unity.

Figure 3:
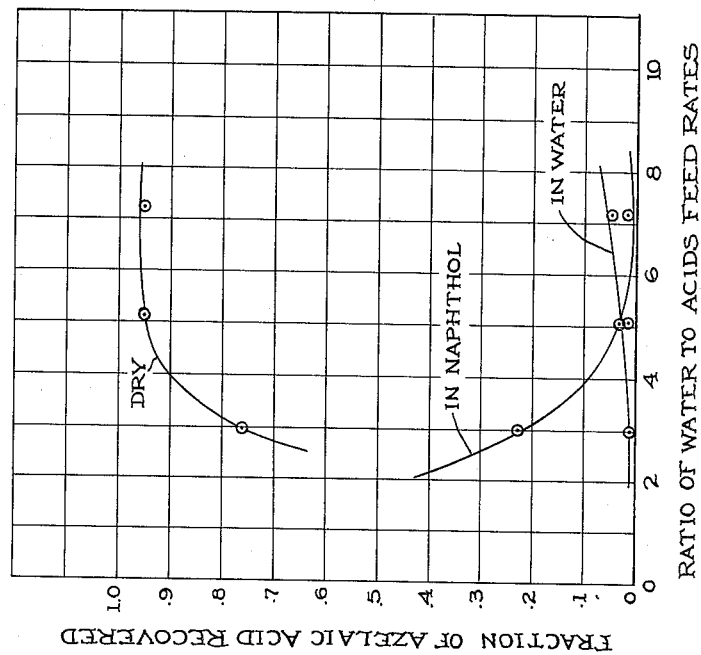

The effect of variation in the relative feed rates is shown by Examples 9 to 13 inclusive. These examples are tabulated in Table III. The data of Table III is shown graphically in FIG. 3 of the accompanying drawings where the loss of azelaic acid as a naphthol soluble acid is plotted against the ratio of naphthol-feed rate to acids-feed rate. In FIG. 3, the dry azelaic acid recovered is also plotted against the ratio of feeds.

Figure 4:
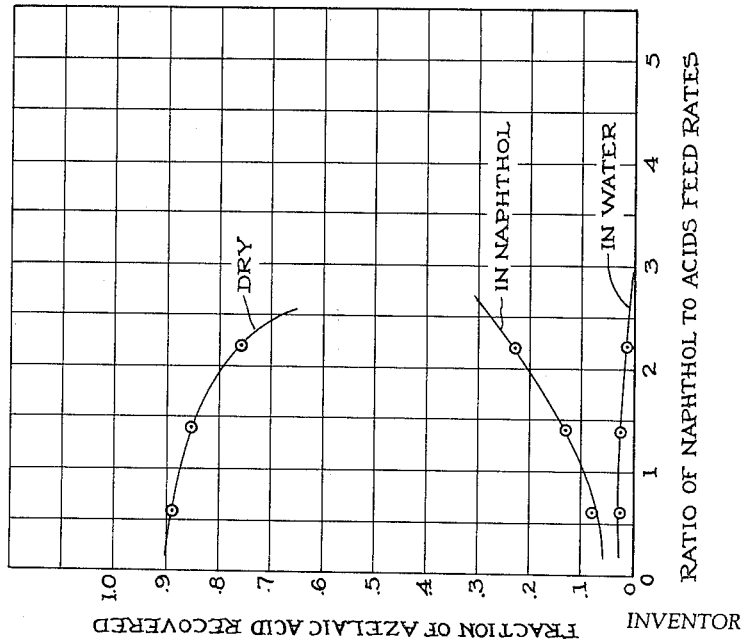

The data of Table III is shown graphically in FIG. 4 of the accompanying drawings where the loss of azelaic acid as a naphthol soluble acid is plotted against the ratio of water feed rate to acids feed rate. The dry azelaic acid recovered is also plotted against the ratio of feeds.

It is seen from the results of Table III and from FIG. 3 and FIG. 4 that undue losses of azelaic acid in the organic phase is prevented by proper selection of the ratio of feeds.

Table I

| Example No | 1 | 2 | 3 | 4 | 5 | 6 |
|---|---|---|---|---|---|---|
| A, Acids Feed, Lbs | 5.00 | 5.00 | 5.00 | 5.00 | 5.00 | 5.00 |
| W, Water Feed, Lbs | 23.00 | 23.00 | 23.00 | 24.00 | 24.00 | 24.00 |
| N, Naphthol Feed, Lbs | 11.00 | 11.00 | 11.00 | 11.00 | 11.00 | 11.00 |
| D, Azelaic Acid in Acids, Lbs | 1.50 | 1.50 | 2.50 | 1.45 | 1.70 | 2.20 |
| T, Temperature, °C | 85 | 75 | 88 | 80 | 82 | 84 |
| W/A, Ratio Feeds | 4.6 | 4.6 | 4.6 | 4.8 | 4.8 | 4.8 |
| N/A, Ratio Feeds | 2.2 | 2.2 | 2.2 | 2.2 | 2.2 | 2.2 |
| (a) Dry Azelaic Acid, Lbs | 1.37 | 1.13 | 2.39 | 1.26 | 1.58 | 2.09 |
| (b) Water Soluble Azelaic Acid, Lbs | .09 | .08 | .06 | .07 | .07 | .06 |
| (c) Naphthol Soluble Azelaic Acid, Lbs | .02 | .29 | .06 | .11 | .06 | .04 |
| Total Azelaic Recovered, Lbs | 1.48 | 1.50 | 2.51 | 1.44 | 1.71 | 2.19 |

Table II

| Example No | 7 | 8 |
|---|---|---|
| A, Acids Feed, Lbs | 5.00 | 5.00 |
| W, Water Feed, Lbs | 23.00 | 23.00 |
| N, Naphthol Feed, Lbs | 11.00 | 11.00 |
| D, Azelaic Acid in Acids, Lbs | 1.85 | 2.05 |
| T, Temperature, °C | 88 | 88 |
| W/A, Ratio Feeds | 4.6 | 4.6 |
| N/A, Ratio Feeds | 2.2 | 2.2 |
| (a) Dry Azelaic Acid, Lbs | 1.72 | 1.94 |
| (b) Water Soluble Azelaic Acid, Lbs | .07 | .06 |
| (c) Naphthol Soluble Azelaic Acid, Lbs | .06 | .05 |
| Total Azelaic Acid Recovered, Lbs | 1.85 | 2.05 |

Table II

| Example No | 9 | 10 | 11 | 12 | 13 |
|---|---|---|---|---|---|
| A, Acids Feed, Lbs | 8.00 | 5.00 | 5.00 | 8.00 | 5.00 |
| W, Water Feed, Lbs | 24.00 | 25.30 | 36.30 | 24.00 | 24.00 |
| N, Naphthol Feed, Lbs | 11.00 | 11.00 | 11.00 | 5.00 | 11.00 |
| D, Azelaic Acid in Acids, Lbs | 3.51 | 2.20 | 2.20 | 3.51 | 2.20 |
| T, Temperature, °C | 82 | 82 | 82 | 82 | 82 |
| W/A, Ratio Feeds | 3.0 | 5.1 | 7.2 | 3.0 | 3.0 |
| N/A, Ratio Feeds | 1.4 | 2.2 | 2.2 | 0.62 | 2.2 |
| (a) Dry Azelaic Acid, Lbs | 2.99 | 2.09 | 2.07 | 3.12 | 1.67 |
| (b) Water Soluble Azelaic Acid, Lbs | .08 | .06 | .09 | .10 | .02 |
| (c) Naphthol Soluble Azelaic Acid, Lbs | .46 | .04 | .04 | .28 | .51 |
| Total Azelaic Acid Recovered, Lbs | 3.53 | 2.19 | 2.20 | 3.50 | 2.20 |

It will now be apparent to those skilled in the art that the present invention provides novel processes for the separation and recovery of monobasic and dibasic acids including the extraction of the acids with polar and non-polar solvents at temperatures above the dissociation temperature followed by cooling and crystallization of the dibasic acids from the polar solvent and distillation recovery and separation of the non-polar solvent from the monobasic acids, which in every way satisfy the objects described above.

What is claimed is:

1. In a process for the separation of saturated aliphatic acids having from three to ten carbon atoms in the molecule the steps of countercurrently extracting a mixture of said monobasic and dibasic acids containing dibasic acids in amount greater than approximately 0.10 of the total acids between a polar and non-polar solvent at a temperature above the temperature of dissociation, approximately 85° C., of the acid complexes, the ratio of polar solvent feed rate to acids feed rate being greater than approximately 5, the ratio of non-polar solvent feed rate to acids feed being approximately 1, cooling the polar solution and recovering the dibasic acids contained therein by crystallization, distilling the non-polar solution and separating by distillization the non-polar solvent and the monobasic acids contained therein.

2. A process as described in claim 1 in which the mixture of acids is a mixture of monobasic acids selected from the group consisting of caproic, heptylic, caprylic, pelargonic and capric acids together with dibasic acids selected from the group consisting of adipic, pimelic, suberic, azelaic and sebacic acids.

3. A process as described in claim 1 in which the polar solvent is water.

4. A process as described in claim 1 in which the non-polar solvent is an aliphatic hydrocarbon having a boiling point up to 200° C.

5. A process as described in claim 1 in which the non-polar solvent is naphthol mineral spirits.

References Cited in the file of this patent

UNITED STATES PATENTS

| | | |
|---|---|---|
| 2,278,309 | Freeman | Mar. 31, 1942 |
| 2,785,198 | Grosskinsky et al. | Mar. 12, 1957 |
| 2,824,134 | Hill et al. | Feb. 18, 1958 |
| 2,841,601 | Hill et al. | July 1, 1958 |
| 2,916,502 | Allen et al. | Dec. 8, 1959 |

UNITED STATES PATENT OFFICE
CERTIFICATE OF CORRECTION

Patent No. 2,998,439                  August 29, 1961

Thomas C. Manley

It is hereby certified that error appears in the above numbered patent requiring correction and that the said Letters Patent should read as corrected below.

Column 3, line 14, for "1" read -- 10 --; column 5, heading to the last table, for "Table II" read -- Table III --.

Signed and sealed this 23rd day of January 1962.

(SEAL)
Attest:

ERNEST W. SWIDER
Attesting Officer

DAVID L. LADD
Commissioner of Patents